United States Patent
Jackson

[19]

[11] Patent Number: 5,942,289
[45] Date of Patent: Aug. 24, 1999

[54] HARDFACING A SURFACE UTILIZING A METHOD AND APPARATUS HAVING A CHILL BLOCK

[75] Inventor: Hewy E. Jackson, Porter, Tex.

[73] Assignee: Amorphous Technologies International, Laguna Niguel, Calif.

[21] Appl. No.: 08/824,415

[22] Filed: Mar. 26, 1997

[51] Int. Cl.[6] ................................................. B05D 3/00
[52] U.S. Cl. ................................. 427/398.2; 427/398.1; 427/446; 427/456; 219/76.11; 219/76.12; 219/76.14; 228/222; 228/46; 118/69; 118/302
[58] Field of Search .................... 427/398.1, 446, 427/456, 398.2; 118/69, 302; 219/76.11, 76.14, 76.12; 228/222, 46

[56] References Cited

U.S. PATENT DOCUMENTS

| | | | |
|---|---|---|---|
| 3,558,846 | 1/1971 | Vjiie | 219/76.11 |
| 3,696,228 | 10/1972 | Thomas, Jr. et al. | 219/76.11 |
| 3,742,585 | 7/1973 | Wentzell | 427/398.2 |
| 4,309,587 | 1/1982 | Nakano et al. . | |
| 4,321,289 | 3/1982 | Bartsch | 427/398.2 |
| 4,373,128 | 2/1983 | Asai et al. . | |
| 4,570,568 | 2/1986 | Fair | 118/69 |
| 4,707,581 | 11/1987 | Blaskovits et al. . | |
| 4,850,524 | 7/1989 | Schick | 228/102 |

OTHER PUBLICATIONS

American Welding Society, Welding Handbook, R.L. O'Brien, ed., "Electroslag Welding", vol. 2, pp. 272–273 (1991) (No month date).

ASM Handbook, vol. 6, "Electroslag and Electrogas Welding", pp. 274–275 (1993) (No month date).

*Primary Examiner*—Katherine A. Bareford
*Attorney, Agent, or Firm*—Gregory Garmong

[57] ABSTRACT

A hardfacing apparatus includes a deposition head including a heat source, a hardfacing material source, and a chill block having a chill block surface. The deposition head is positioned at a location so as to deposit a mass of the hardfacing material onto the workpiece surface. The chill block is positioned remote from the deposition head with the chill block surface in a facing-but-spaced-apart relation to the workpiece surface, separated from the workpiece surface by a gap having a dimension between the chill block and the workpiece surface of a standoff distance $D_S$. Molten hardfacing material is deposited onto the workpiece surface from the deposition head. Simultaneously, the workpiece surface is moved relative to the hardfacing apparatus so that the molten hardfacing material passes into the gap and is molten as it enters the gap.

18 Claims, 3 Drawing Sheets

HARDFACING A SURFACE UTILIZING A METHOD AND APPARATUS HAVING A CHILL BLOCK

BACKGROUND OF THE INVENTION

The present invention relates to the hardfacing of a surface, and, more particularly, to the deposition of a hardfacing deposit having a controlled, uniform maximum thickness and a smooth surface.

Hardfacings of relatively hard materials are positioned overlying the surfaces of relatively softer substrate materials in order to protect the softer materials against surface damage such as erosion, galling, and corrosion. The hardfacing material may be provided in any of several ways. In one approach, the hardfacing material is melted, contacted to the substrate, and allowed to solidify against the substrate. This technique is sometimes termed welding because the hardfacing deposit is joined to the substrate by solidification, but is distinct from the other type of welding wherein two solid pieces are joined together by a molten weldment.

In hardfacing by welding, the substrate is moved relative to the heat source and hardfacing material source. The hardfacing material initially forms a molten pool on the substrate surface, which thereafter solidifies as the heat source moves away from an area and heat is removed from the molten pool. The heat input from the heat source is usually adjusted so that the underlying substrate is melted to a shallow depth at its surface. Consequently, the molten hardfacing material and the melted region at the surface of the substrate material locally mix, with the result that, after solidification of the hardfacing, there is a good interfacial bond between the hardfacing deposit and the substrate.

While operable and widely used in industry, hardfacing by welding has drawbacks in some applications. Due to surface tension and other effects, upon solidification the hardfacing deposit is relatively irregular with a bumpy surface. For applications requiring a smooth surface, the hardfacing overlay must thereafter be ground or machined to make the surface smoother, an expensive and time-consuming operation. After grinding or machining, there may still be irregularities in the surface of the hardfacing overlay, between low spots and the machined or ground region. Surface cracks due to stress relief are sometimes found in the hardfacing, which can lead to penetration of erosive or corrosive agents into and through the hardfacing overlay. Such stress relief cracks are acceptable in limited numbers and particular orientations. However, it is preferred to reduce the incidence of cracking.

Additionally, it is difficult to apply a regular and uniform hardfacing deposit circumferentially onto a curved surface, such as the surface of a cylindrical pipe or shaft. The curved surface must be held horizontal, and the molten pool must be applied very near the top dead center of the horizontal region. Even then, because the solidification requires a period of time, the surface must be moved relatively slowly so that the still-molten pool does not run down the curved surface, resulting in wide variations in the thickness of the deposit. This slow movement reduces the production rate, with adverse effects on the economics of the hardfacing processing. And, even when the movement of the surface is relatively slow, the molten pool is often deformed and irregular, further increasing the tendency to surface irregularity of the final solidified deposit.

There is a need for an improved approach to hardfacing by welding that overcomes these drawbacks. The present invention fulfills this need, and further provides related advantages.

SUMMARY OF THE INVENTION

The present invention provides a hardfacing apparatus that, when used in the hardfacing method of the invention, produces an improved hardfacing overlay on both flat and curved surfaces. The hardfacing is of nearly constant thickness and the hardfacing surface is smooth and regular upon application, reducing or eliminating the requirements for final grinding or machining of the overlay. Stress relief cracking of hardfacings of many materials is reduced substantially. The hardfacing may be applied to curved surfaces more easily and with reduced process control limitations, as compared with the conventional techniques. The hardfacing deposition rate is increased significantly, improving the process economics. The heat loading into the workpiece is relatively small.

In accordance with the invention, a method of hardfacing a workpiece comprises providing a workpiece having a workpiece surface, and providing a hardfacing apparatus comprising a deposition head and a chill block having a chill block surface. The chill block is preferably made of a high-thermal-conductivity material that is water cooled. The deposition head includes a heat source and a hardfacing material source. The chill block is positioned remote from the deposition head with the chill block surface in a facing-but-spaced-apart relation to the workpiece surface. The chill block is separated from the workpiece surface by a gap having a dimension between the chill block and the workpiece surface of a standoff distance $D_S$. Molten hardfacing material is deposited onto the workpiece surface from the deposition head at a location remote from the gap. The workpiece surface is moved relative to the hardfacing apparatus. Such relative movement is achieved either by moving the substrate, or the heat source and hardfacing material source, or both. As the hardfacing material is deposited, the molten hardfacing material passes into the gap such that a free surface of the molten hardfacing material deposited onto the workpiece surface remains molten as it enters the gap.

In a particularly advantageous application, the workpiece has a locally curved surface of constant convex radius of curvature $R_C$. The chill block surface has a constant concave radius of curvature of $R_C + D_S$. As the molten material of the molten pool passes into the gap between the workpiece and the chill block surface, the chill block surface evens out the molten pool by causing a lateral flow of the molten material to fill in adjacent shallow regions with excess material from other regions. The chill block surface also smooths the upper surface of the molten material and accelerates its cooling and solidification to produce a smooth, regular surface on the final hardfacing weldment. The presence of the chill block also reduces the requirement for tight process control on the precise positioning of the deposition head. The molten pool is permitted to run down the curved surface, because the chill block surface limits the extent of the running of the molten hardfacing material and, in any event, smooths and evens the molten material that does run.

In one application of this type of interest to the inventor, a hardfacing band is applied around the circumference of a cylindrical pipe. The pipe is rotated about its cylindrical axis under a stationary deposition head and chill block. Because of the presence of the chill block, there is much less concern with running of the molten material and the need for precise positioning of the deposition head. The use of the hardfacing approach of the invention results in an increased deposition rate nearly double that achieved by the conventional method.

In addition to improving the process economics, the approach of the invention also results in a substantially improved hardfacing layer and improved metallurgical structure in the hardfacing layer. The gap between the chill block and the workpiece surface results in a hardfacing layer of nearly constant thickness. The contact of the chill block surface to the molten pool smooths the molten hardfacing material and results in greatly reduced surface irregularities in the solidified hardfacing weldment. In trials conducted by the inventor, the hardfacing bands produced on cylindrical pipes were so smooth and regular that no subsequent machining or grinding was required. The metallurgical structure of the hardfacing is improved, with greatly reduced incidence of stress relief surface cracking many materials that may be applied by this approach.

The deposition head is laterally separated from the chill block during the deposition operation. The heat source of the deposition head may therefore be selected as appropriate to the particular hardfacing application. The deposition head and the chill block may be optimized and moved independently of each other.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
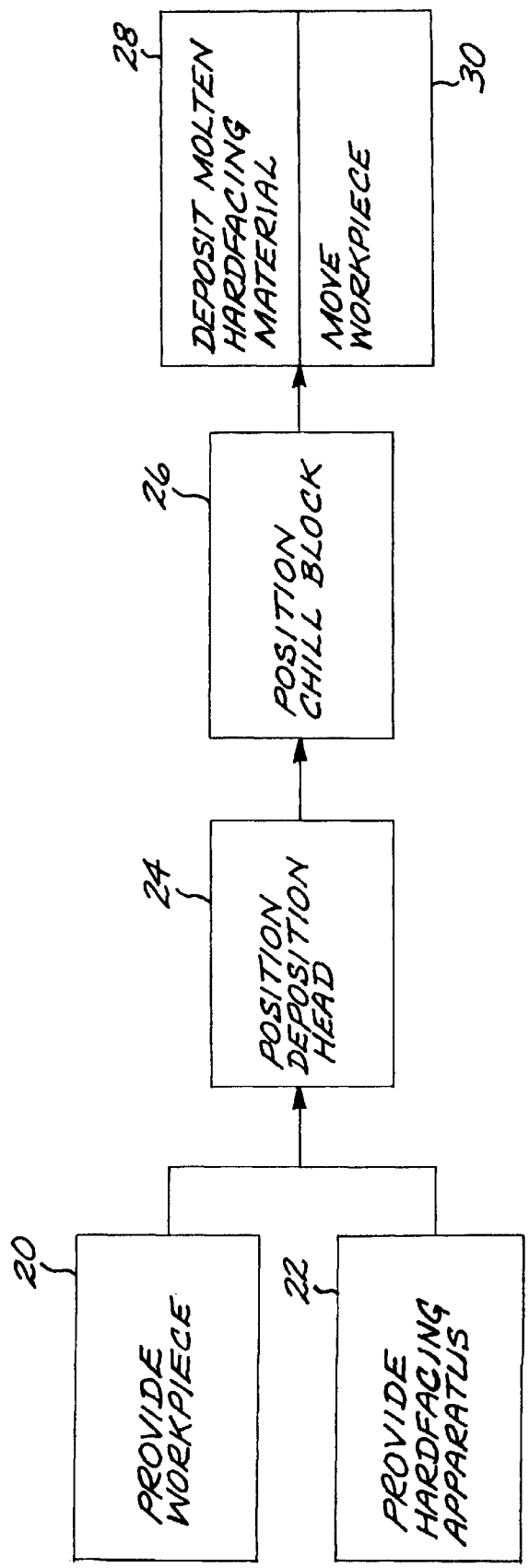
FIG. 1 is a block diagram of a method according to the invention.
Figure 2:
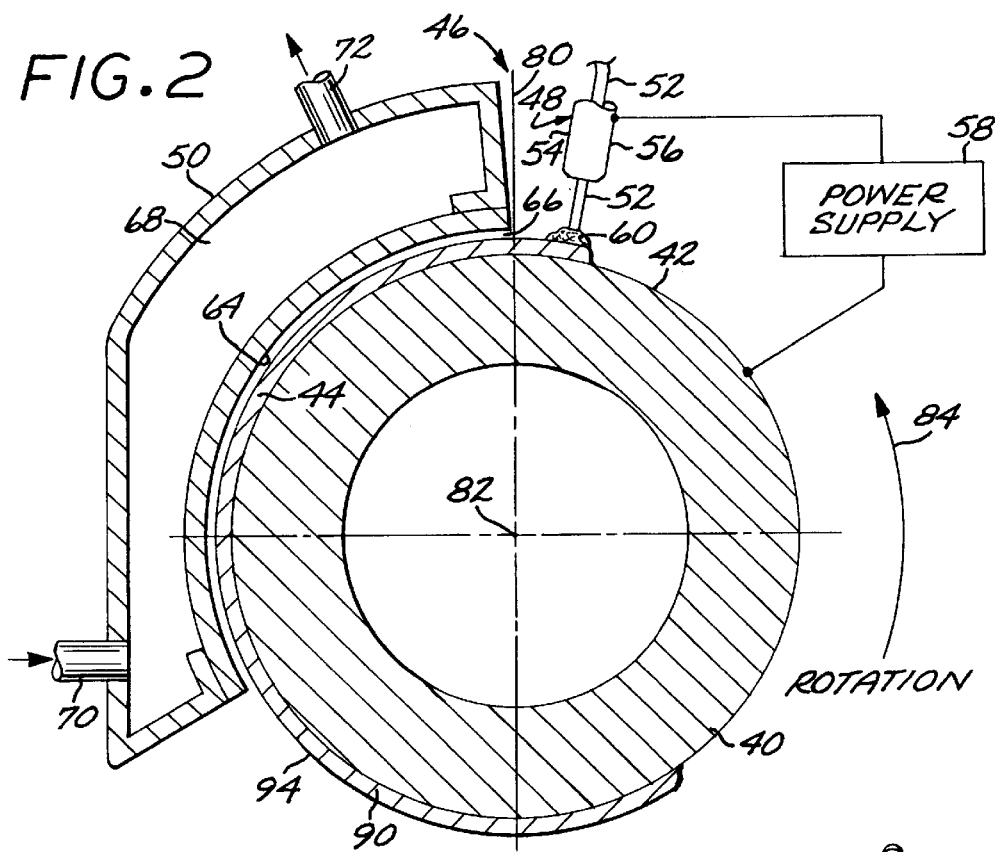
FIG. 2 is a sectional view of a cylindrical workpiece and hardfacing apparatus.
Figure 3:
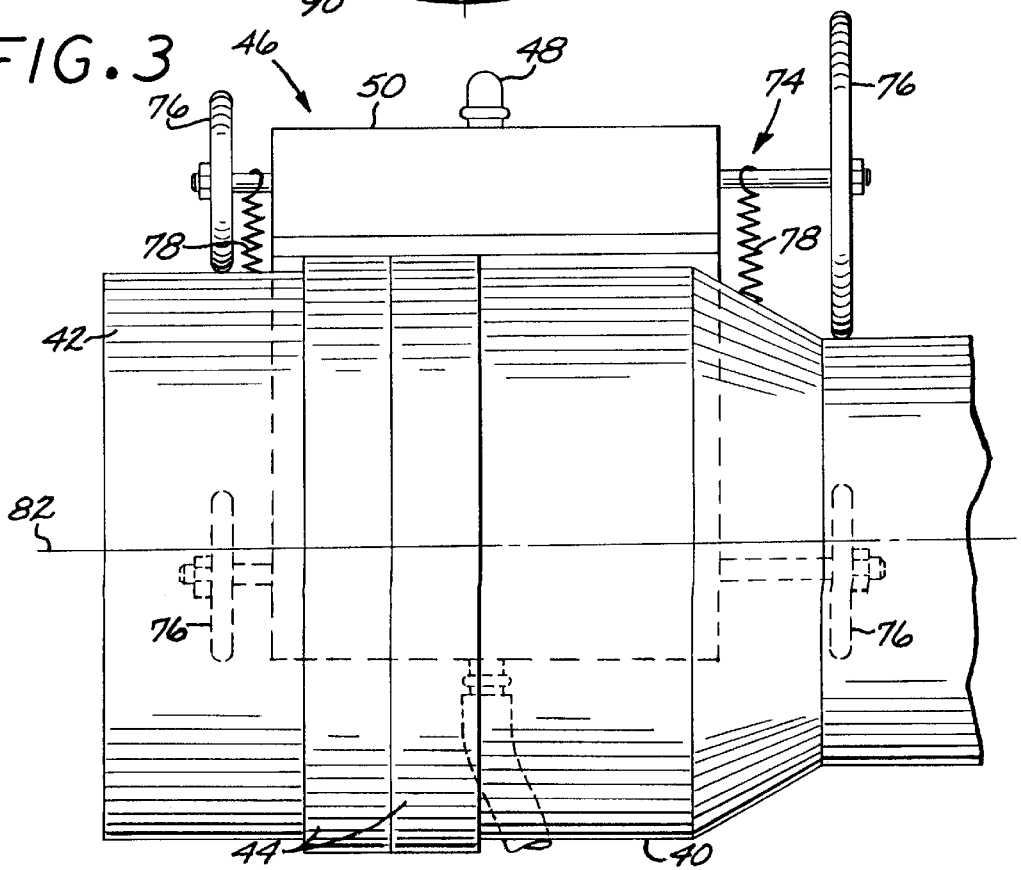
FIG. 3 is an elevational view of the workpiece and hardfacing apparatus of FIG. 2.
Figure 4:
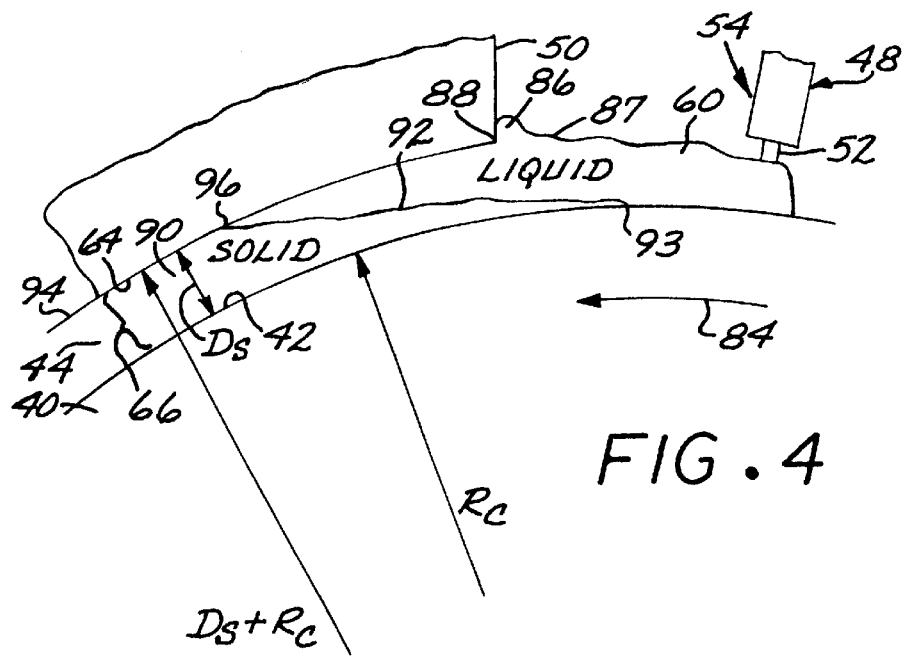
FIG. 4 is a schematic enlarged detail of FIG. 2.

FIG. 1 is a block diagram of a preferred method for practicing the invention, and FIGS. 2–4 are views of the hardfacing apparatus and workpiece. A workpiece is provided, numeral 20. The workpiece of FIGS. 2–4 is a hollow cylindrical pipe 40 having an exterior workpiece surface 42, the preferred application at this time. A hardfacing layer is to be applied to the surface 42 in the form of circumferentially extending bands 44 that are typically 1 inch wide and 1/8 inch thick. The surface 42 has a radius of curvature $R_C$. The present invention is equally applicable to the hardfacing of other forms of surfaces 42, such as irregularly curved surfaces and flat surfaces.

The presently preferred application is of particular interest because hardfacing bands have, in the past, been applied to downhole pipe used in the oil-drilling industry. The bands contact against an inside surface of an overlying pipe casing (not shown) as the pipe 40 is rotated to turn a bit at the end of the pipe in the drilling operation. The surface of the hardfacing band must be smooth, as it rides against the inside surface of the pipe casing. In conventional hardfacing approaches, it is quite difficult and slow to deposit a hardfacing band uniformly around the circumference of the pipe, and the hardfacing band, once deposited, requires extensive grinding to smooth its surface prior to use. There is a substantial amount of stress relief cracking of the bands deposited by the prior approach.

A hardfacing apparatus 46 according to the present invention is provided, numeral 22. The hardfacing apparatus 46 includes two major components, a deposition head 48 and a chill block 50. The deposition head 48 heats and deposits the molten hardfacing material onto the surface 42 at a location remote from the chill block 50. Any operable deposition device may be used. In the preferred approach, the deposition head 48 uses a hardfacing material source 52 in the form of a wire having the composition of the hardfacing material. A heat source 54 includes an annular electrode 56 and a power supply 58 that applies a voltage between the workpiece (pipe 40) and the electrode 56. The hardfacing material source 52 is fed through the center of the electrode 56, where it contacts the electrode 56. The electrical current that flows through the circuit including the power supply 58, the pipe 40, the hardfacing material source 52, and the electrode 56 heats the end of the hardfacing material source 52 as it contacts the surface 42. The hardfacing material source 52 is melted to form a molten pool 60 of the hardfacing material on the surface 42 of the pipe 40. The near-surface region of the pipe 40 under the molten pool is also typically melted to a shallow depth. The hardfacing material mixes with the melted base metal of the pipe, resulting in a strong bond of the hardfacing material to the pipe upon later solidification.

The deposition head 48 may be of any operable type. The illustrated electrical heating approach is preferred, but the heat source could be a laser, a plasma source, or any other operable heat source. Because the deposition head 48 is remote from the chill block 50, the design of each is not constrained by the design of the other and the requirement that they fit together in close proximity. The deposition head 48 may be precisely controlled, and may be moved closer to or further from the chill block 50 as required for particular workpieces and hardfacing materials.

The hardfacing material may be any operable material. A preferred such hardfacing material, available from Amorphous Technologies International, Laguna Niguel, Calif., as Armacor M*™ alloy, has a composition in weight percent of about 27.75 percent chromium, about 6.0 percent nickel, about 3.45 percent boron, about 1.8 percent manganese, about 1.05 percent silicon, 0.2 percent maximum carbon, balance iron. Other operable hardfacing materials include alloys containing phases such as tungsten carbide and chromium carbide, austenitic alloys such as manganese steels, and high-alloy steels used for corrosion resistance, erosion resistance, strength and corrosion resistance, and/or strength and erosion resistance. The workpiece may be any operable material, but steel is preferred.

The hardfacing apparatus 46 further includes the chill block 50. The chill block 50 is a body having a chill block surface 64 curved to conform to the shape of the surface 42 of the pipe 40, allowing for a separation from the surface 42 by a preselected distance. In the illustrated case, the chill block surface 64 is a convex segment of a cylinder. In operation, the chill block 50 is positioned in a facing-but-spaced-apart relationship to the pipe 40, with a gap 66 therebetween. The gap 66 has a dimension $D_S$ that defines a standoff distance of the chill block 50 from the pipe 40. The chill block surface 64 therefore has a cylindrical radius of curvature $R_C + D_S$. In the event that the workpiece is flat or of some other curved configuration, the chill block surface is shaped accordingly.

The chill block 50 is water cooled. In the illustrated embodiment, the chill block 50 is formed of sheet or plate material so that an entire interior 68 of the chill block 50 is hollow. Water is flowed through the interior 68 of the chill block 50 via an inlet pipe 70 and an outlet pipe 72. Other operable configurations may also be used. For example, the chill block may be a block with cooling channels running therethrough. The chill block could also be a solid body with cooling provided by a spray against its opposite surface remote from the workpiece.

The chill block 50 is preferably formed of a material having a high thermal conductivity, most preferably at least about 90 BTU/ft-hr-°F., for hardfacing with the preferred hardfacing materials. The material of construction is desirably copper (including unalloyed copper and copper alloys) or aluminum (including unalloyed aluminum and aluminum alloys), both of which have relatively high thermal conductivity and sufficient mechanical strength. Copper alloys and aluminum alloys are most preferred, so as to avoid excessive wear of the chill block 50. In some instances, however, it may be desirable to cool the molten hardfacing deposit more slowly, and a non-cooled chill block, or a chill block made of material of lower thermal conductivity, may be used. In yet other cases, the chill block could be heated to remove heat from the hardfacing material more slowly. In all such instances, the "chill block" terminology remains appropriate, because the molten hardfacing material is chilled by its contact with the block.

The deposition head 48 and the chill block 50 may be independently supported, or, more preferably, are supported together in a carriage 74. The carriage 74 supports the deposition head 48 and the chill block 50 in a desired fixed relation to each other and to the workpiece. In the case of the workpiece in the form of the pipe 40, the carriage 74 includes wheels 76 (or equivalently, stationary spacers) that rest against the surface 42 of the pipe 40 and springs 78, reacting with the frame of the carriage, that hold the deposition head and chill block in a desired relation to each other and to the surface 42.

The deposition head 48 is positioned relative to the pipe 40, numeral 24. The deposition head 48 is preferably positioned at a circumferential location near the top-dead-center position 80 of the pipe 48, but need not be at exactly the top. The deposition head 48 is spaced a distance from the pipe suitable for the particular type of deposition head selected.

The chill block 50 is positioned radially adjacent to the pipe 40 and circumferentially relative to, but remote from, the deposition head 48, numeral 26. The chill block 50 is positioned radially relative to the pipe 40 with the chill block surface 50 the standoff distance $D_S$ from the surface 42. The chill block 50 is positioned circumferentially a distance from the deposition head 48 such that, when the pipe 40 is rotated about its cylindrical axis 82 in the direction indicated by the arrow 84, at least some of the molten pool 60 will extend to the chill block 50. Stated alternatively, at least some of the hardfacing material in the molten pool 60, at and near its free surface, will be molten as it enters the gap 66 between the pipe 40 and the chill block surface 64. The circumferential angular separation between the deposition head 48 and the chill block 50 is typically from about 10 to about 60 degrees. The configuration of the carriage is selected to maintain these positional relationships.

The deposition head 48 is operated to feed hardfacing material, melt the hardfacing material, and form the molten pool 60, numeral 28. Simultaneously, the pipe 40 is rotated about its cylindrical axis 82 in the direction indicated by the arrow 84, numeral 30. Molten material in the pool 60 is carried into the region of the gap 66 between the chill block surface 64 and the surface 42.

FIG. 4 illustrates the result. The molten pool naturally has irregularities in the amount of hardfacing material present at any location along the direction parallel to the cylindrical axis 82. These variations are in part responsible for the uneven surface of hardfacings made by the prior approaches. In the present approach, any excess material 86 in a local region of the molten pool 60 is prevented from entering the gap 66 by a leading edge 88 of the chill block 50. Such excess material 86 flows in the direction parallel to the cylindrical axis 82 (i.e., into or out of the plane of the page in the view of FIGS. 2 and 4, and parallel to the horizontal in the view of FIG. 3). This evens out the irregularities that would otherwise be present, resulting in a much more uniform thickness of the final solidified hardfacing layer 90.

Additionally, an outwardly facing free surface 87 of the hardfacing material of the molten pool 60 solidifies against the chill block surface 64, which is made relatively smooth. The interface between the liquid and the solid hardfacing material in the molten pool 60 is indicated schematically by a liquid-solid interface 92. Solidification of the molten pool 60 starts at a location 93 near to the deposition head 48, and against the workpiece (the pipe 40). The free (outwardly facing) surface of the molten pool 60 remains liquid, because heat transfer from the free surface to air is much slower than heat transfer from the hardfacing material into the workpiece. The liquid-solid interface 92 is therefore angled outwardly with increasing distance from the deposition head 48. Significantly, the molten hardfacing material at and near the free surface 87 of the molten pool 60 remains liquid as it reaches the leading edge 88, so that the last of the molten pool 60 to solidify does so in contact with the cooling/shaping surface 64 within the gap 66. The result of the hardfacing material solidifying in this manner is a strong bond of the hardfacing layer 90 to the workpiece, and also a smooth free surface 94 of the hardfacing layer 90. There is little oxidation of the free surface 94 because it is molten for only a short time—the time necessary for the surface of the workpiece to move the distance between the deposition head 48 and the cooling/shaping head 50. Tests conducted by the inventor on the hardface banding of pipes, as shown in FIGS. 2–3, demonstrated that the outer surface 94 of the hardfacing layer is sufficiently smooth that no post-hardfacing machining or grinding is necessary, an important and major cost savings in the production operation.

The presence of the chill block and the controlled solidification of the molten pool in the gap 66 results in an ability to conduct the hardfacing operation much faster than in prior approaches. In the prior approaches, it was necessary to position the deposition head at a location very close to top-dead-center of the pipe and to rotate the pipe relatively slowly so that the molten pool would solidify before the pipe had rotated to a degree that molten hardfacing material would run down the face of the pipe. The containment effect achieved by the chill block 50, as illustrated at numeral 86 in FIG. 4, allows the pipe to be rotated much faster, also reducing the cost of the hardfacing operation. In the prior processing approach, the hardfacing of a 6-⅝ inch outside diameter pipe required a time of about 130–160 seconds per hardfacing band. In the present approach, that time is reduced to about 80 seconds per hardfacing band, with improved surface and microstructure of the hardfacing band.

Metallurgical studies have demonstrated that the metallurgical structure of the hardfacing material produced by the present approach is superior to that of the hardfacing material produced by the prior approach, for at least some materials. In the case of the most-preferred Armacor M* hardfacing material, the number of stress relief cracks in the hardfacing material is reduced to less than about ¼ the number found in the hardfacing bands produced by the present approach as compared with hardfacing bands produced by the prior approach. In many cases, there were no stress relief cracks in the Armacor hardfacing produced by the present approach.

Figure 5:
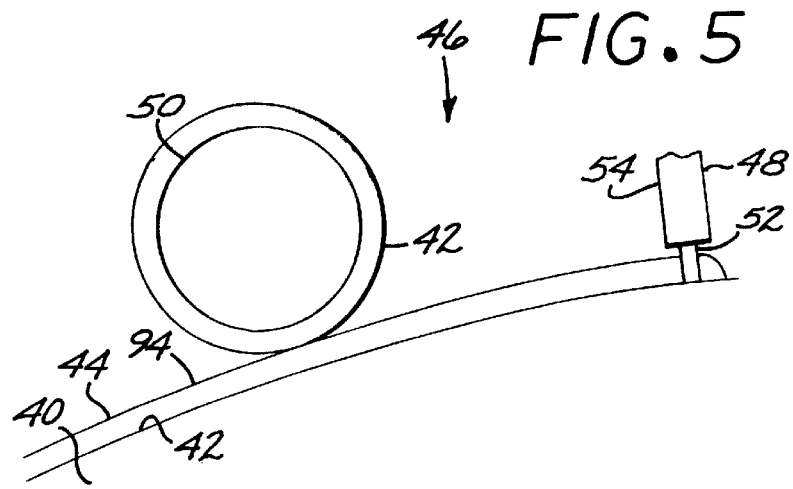
FIG. 5 is a schematic detail of an apparatus using a cylindrical chill block.
Figure 6:
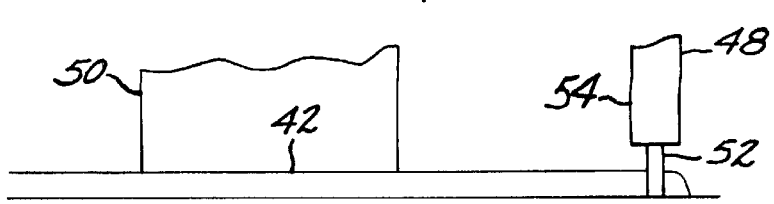
FIG. 6 is a schematic detail of an apparatus using a flat chill block.

The chill block may have other operable configurations than the one illustrated. The chill block 50 may be a hollow roller, ball, or other configuration, as shown in FIG. 5. The cylindrical chill block 50 is mounted on bearings and turns with the movement of the workpiece. Such chill blocks have the advantages that they roll rather than slide, reducing surface wear, and can be made to trace over the surfaces of irregularly curved workpieces. They have the disadvantage that the cooling power is lower, because less of their surface contacts the hardfacing layer. The chill block may also be flat, as shown in FIG. 6, for use with a flat workpiece.

The present approach is distinct from hardfacing by the electroslag melting approach, which has been previously used to apply continuous hardfacings (as distinct from bands) to cylindrical workpieces such as rolling mill rolls. In that technique, a water-cooled shoe is placed adjacent to the surface of the workpiece. Hardfacing metal is melted into the space between the water-cooled shoe and the workpiece by a consumable electrode arc. A slag is maintained on the surface of the molten metal to protect it against oxidation during the prolonged molten period, usually limiting the workpiece to a vertical orientation. The melting requires a very large power input, which melts not only the hardfacing material but a substantial depth of the substrate. The substrate is significantly heated and the hardfacing material is diluted by the excess melted substrate material. In the present approach, because the deposition source is remote from the gap between the chill block and the workpiece, the heat flow into the cooling/shaping head is much smaller and, consequently, the power required from the heat source is much less. There is less heating and melting of the underlying workpiece substrate, and less dilution of the hardfacing material. There is, accordingly, greater latitude in the selection of the hardfacing material and of the heat source. In the present approach, the surface being hardfaced is open to view, so that inspection is easier and automated control techniques may be readily used. The approach of the present invention may be utilized with non-vertical orientations of the workpiece, and with workpieces such as hollow pipes that would be difficult or impossible to hardface because of the high heat input inherent in electroslag hardfacing.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of hardfacing a workpiece, comprising:
providing a workpiece having a workpiece surface;
providing a hardfacing apparatus, comprising:
 a deposition head including
  a heat source, and
  a hardfacing material source, and
 a chill block having a chill block surface;
positioning the chill block at a location with the chill block surface in a facing-but-spaced-apart relation to the workpiece surface, the chill block being separated from the workpiece surface by a gap having a dimension between the chill block and the workpiece surface of a standoff distance $D_S$;
positioning the deposition head to deposit a mass of the hardfacing material onto the workpiece surface at a location remote from the gap;
depositing molten hardfacing material onto the workpiece surface from the deposition head such that there is a free surface to air of a molten hardfacing material between the deposition head and the chill block; and
moving the workpiece surface relative to the hardfacing apparatus, the chill block being positioned at a location such that the molten hardfacing material passes into the gap and such that a free surface of the molten hardfacing material deposited onto the workpiece surface remains molten as it enters the gap.

2. The method of claim 1, wherein the step of providing a workpiece includes the step of
providing a workpiece having a locally curved surface of constant radius of curvature $R_C$, and
wherein the step of providing a hardfacing apparatus includes the step of
providing a chill block surface having a radius of curvature equal to $R_C+D_S$.

3. The method of claim 1, wherein the step of providing a workpiece includes the step of
providing a workpiece having a locally substantially cylindrical workpiece surface, and
wherein the step of providing a hardfacing apparatus includes the step of
providing a chill block surface having a curvature selected to conform to that of the substantially cylindrical workpiece surface with the standoff distance $D_S$.

4. The method of claim 3, wherein the step of moving the workpiece surface relative to the hardfacing apparatus includes the step of
maintaining the hardfacing apparatus in a fixed location, and
rotating the workpiece about a cylindrical axis of the substantially cylindrical workpiece surface.

5. The method of claim 1, wherein the step of providing a hardfacing apparatus includes the step of
providing a water-cooled chill block.

6. The method of claim 1, wherein the step of depositing molten hardfacing material includes the step of
depositing an excess of the molten hardfacing material above that required to provide the thickness of the final hardfacing deposit.

7. The method of claim 1, wherein the step of providing a hardfacing material source includes the step of
providing a source of a material selected from the group consisting of an alloy having a composition in weight percent of about 27.75 percent chromium, about 6.0 percent nickel, about 3.45 percent boron, about 1.8 percent manganese, about 1.05 percent silicon, 0.2 percent maximum carbon, balance iron; an austenitic steel; an alloy containing a tungsten carbide phase; and an alloy containing a chromium carbide phase.

8. The method of claim 1, wherein the step of providing a hardfacing apparatus includes the step of
providing a deposition head further including
 a carriage, and
 a carriage support that positions the hardfacing material source at a preselected deposition distance from the workpiece surface; and affixing the heat source and the hardfacing material source to the carriage.

9. The method of claim 1, wherein the step of providing a hardfacing apparatus includes the step of providing the chill block having the chill block surface made of a material having a thermal conductivity of at least about 90 BTU/ft-hr-° F.

10. The method of claim 1, wherein the step of providing a hardfacing apparatus includes the step of providing the chill block having the chill block surface made of a material selected from the group consisting of copper and aluminum.

11. A method of hardfacing a workpiece with a hardfacing deposit of thickness $D_S$, comprising:

providing a substantially cylindrical workpiece having a substantially cylindrical workpiece surface of constant convex radius of curvature $R_C$;

providing a hardfacing apparatus, comprising:
  a deposition head including
    a heat source, and
    a hardfacing material source, and
  a chill block having a chill block surface with a constant concave radius of curvature equal to $R_C+D_S$;

positioning the deposition head at a location so as to deposit a mass of the hardfacing material onto the workpiece surface;

positioning the chill block remote from the deposition head with the chill block surface in a facing-but-spaced-apart relation to the workpiece surface, the chill block being separated from the workpiece surface by a gap having a dimension between the chill block and the workpiece surface of $D_S$;

depositing molten hardfacing material onto the workpiece surface from the deposition head such that there is a free surface to air of molten hardfacing material between the deposition head and the chill block; and rotating the workpiece about its cylindrical axis relative to the hardfacing apparatus, the chill block being positioned at a location such that the molten hardfacing material passes into the gap and such that a free surface of the molten hardfacing material deposited onto the workpiece surface remains molten as it enters the gap.

12. The method of claim 11, wherein the step of providing a hardfacing material source includes the step of providing a source of a material selected from the group consisting of an alloy having a composition in weight percent of about 27.75 percent chromium, about 6.0 percent nickel, about 3.45 percent boron, about 1.8 percent manganese, about 1.05 percent silicon, 0.2 percent maximum carbon, balance iron; an austenitic steel; an alloy containing a tungsten carbide phase; and an alloy containing a chromium carbide phase.

13. The method of claim 11, wherein the step of providing a hardfacing apparatus includes the step of providing a deposition head further including
  a carriage, and
  a carriage support that positions the hardfacing material source at a preselected deposition distance from the workpiece surface; and affixing the heat source and the hardfacing material source to the carriage.

14. The method of claim 11, wherein the step of providing a hardfacing apparatus includes the step of providing the chill block having the chill block surface made of a material having a thermal conductivity of at least about 90 BTU/ft-hr-° F.

15. The method of claim 11, wherein the step of providing a hardfacing apparatus includes the step of providing the chill block having the chill block surface made of a material selected from the group consisting of copper and aluminum.

16. A hardfacing apparatus used to apply a hardfacing to a surface of a workpiece, comprising:

a water-cooled chill block having a chill block surface, the chill block surface being in a facing-but-spaced-apart relation to the surface of the workpiece with a gap between the chill block surface and the workpiece surface;

a hardfacing material source; and a heat source operable to heat and melt the hardfacing material source, and to deposit the melted hardfacing material source onto the surface of the workpiece at a location remote from the gap such that there is a free surface to air of a molten hardfacing material between the hardfacing material source and the chill block.

17. The apparatus of claim 16, wherein the workpiece surface is substantially cylindrical.

18. The apparatus of claim 16, wherein the chill block surface is made of a material selected from the group consisting of copper and aluminum.

* * * * *